Nov. 18, 1952

A. BRÖHL ET AL 2,618,201

APPARATUS FOR DETACHABLY ATTACHING
CAMERA OBJECTIVES TO CAMERAS

Filed Feb. 7, 1951

INVENTORS
August Bröhl
Ludwig Leitz
BY
Benj. T. Rauber
their attorney

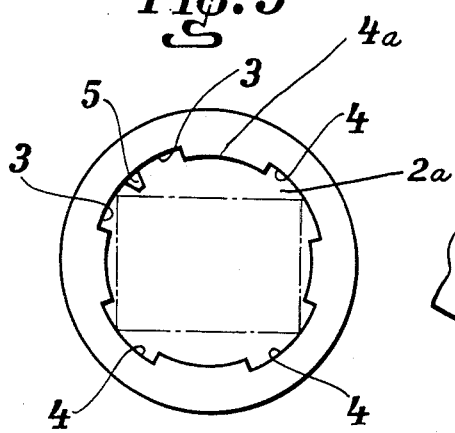
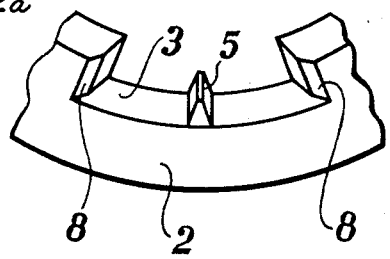
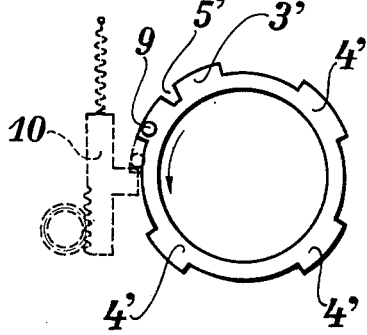
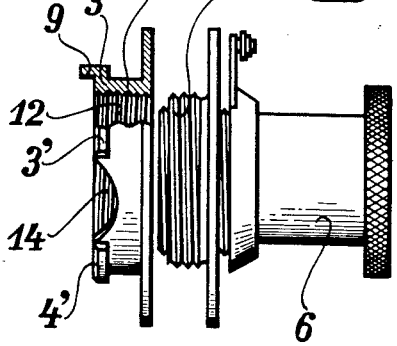

Patented Nov. 18, 1952

2,618,201

UNITED STATES PATENT OFFICE 2,618,201

APPARATUS FOR DETACHABLY ATTACHING CAMERA OBJECTIVES TO CAMERAS

August Bröhl and Ludwig Leitz, Wetzlar/Lahn, Germany, assignors to Ernst Leitz, G. m. b. H., Wetzlar, Germany, a corporation of Germany Application February 7, 1951, Serial No. 209,860
In Germany February 13, 1950

3 Claims. (Cl. 88—57)

The invention relates to an arrangement for detachably attaching two camera members to each other by means of a bayonet device.

Bayonet devices are already known with two, three or four bayonet lugs, these lugs being of different sizes on the one member and fitting into corresponding slots of the other member in order to ensure the connection of those members in a predetermined position relative to each other. However, in spite of such means, difficulties were encountered when trying to attach such members quickly and reliably in daylight and especially at night or in a darkroom. These difficulties are the greater the larger the number of bayonet lugs is. Consequently such camera members were often damaged by forcing the attachment or dropping them accidentally while trying to fit them together.

The present invention does away with those disadvantages by the introduction, on both the camera members, of elements, such as protuberances or notches, which can be readily felt and brought into correct position for properly fitting the bayonet parts without the necessity of controlling the fitting operation visually.

According to another suggestion of the invention the tactile elements can be combined with one of the bayonet lugs of the one camera member and the corresponding bayonet slot of the other member, for instance by giving a different size to this selected bayonet lug and its corresponding slot so that this can be found without visual control.

In another form of application of this invention the selected bayonet lug serving as tactile element for rapid attachment of the two members is notched while the corresponding bayonet slot has a suitable protuberance, ledge or similar link.

To facilitate the attachment still further, at least the bayonet slot which serves as a tactile element is provided with quick fitting means, for instance in the form of rounded off entrance edges or guiding surfaces.

In a further application of the invention the bayonet lug used as tactile element of the one camera member is also intended to serve as a controlling cam which by reason of its shape and position, when the camera members are attached to each other, actuates in a known manner locking or operating elements, such as may be desired for locking the shutter and the winding or for bringing viewfinder frames into position, etc.

The invention and further details as regards its application are fully explained in the attached drawings which, as an example of the application, show a camera with detachably attached lens:

Fig. 3 shows the camera bayonet ring with the tactile element in one of the bayonet slots.

Fig. 4 is a general view of the bayonet slot of the camera bayonet ring provided with the tactile element and quick fitting guide ways.

Fig. 5 is a view of a lens bayonet ring with bayonet lug, the tactile element of which also serves as an actuating cam for control elements of the camera.

Fig. 6 shows a lens with screw-on bayonet ring, one bayonet lug of which has an actuating cam which also serves as tactile element.

Figure 1:
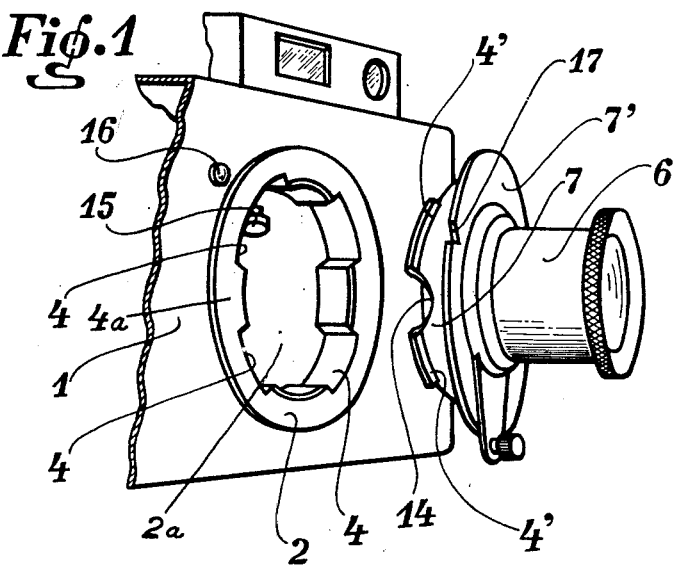
Fig. 1 is a bayonet device, as suggested by the invention, on a camera and its interchangeable lens, the tactile elements being provided on the lens mount and on the camera body.
Figure 2:
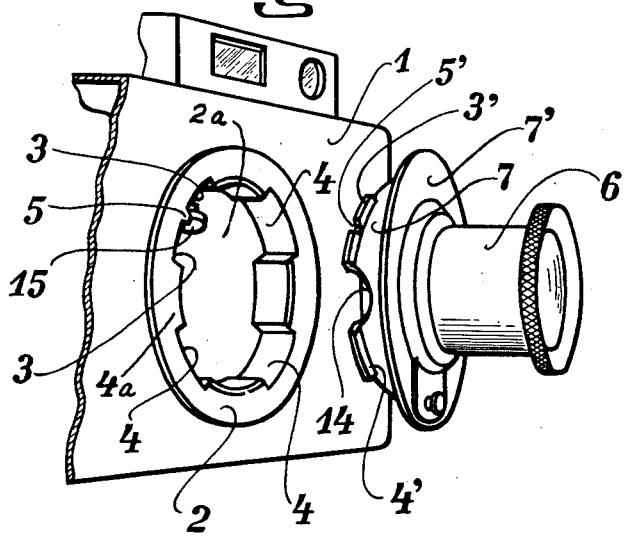
Fig. 2 is a bayonet device as shown in Fig. 1 but with the tactile elements combined with a bayonet lug of the lens mount and the corresponding bayonet slot of the camera.

In the embodiment of the invention illustrated in Fig. 1 and Fig. 2 the camera body 1 is fitted in any known manner with a bayonet ring 2 to provide an opening 2a into which project four bayonet slots 4 of different sizes and radially projecting lugs 4a. The bayonet slots 4 are arranged in correct relation to the rectangular film frame (Fig. 3). The lens 6 includes a flange 7 with the bayonet lugs 4', with the aid of which it is attached to the camera 1 and the positioning ring 7' of the lens 6 which are tightly connected when the camera members 1, 6 are attached to each other.

As shown in Fig. 1 the connection of lens 6 to camera 1 requires proper orientation of the bayonet slots 4 and bayonet lugs 4', and to achieve this, even without controlling it visually, the positioning ring 7' is provided with the slot 17 which can be felt as easily as the corresponding bolt-head 16 in the camera 1. Bolt-head 16 and slot 17 may be of any appropriate form and they may also be made use of for other functions as regards the camera. They must only remain unaltered as regards their position on the camera member concerned and be made in such a way that they are easily and reliably felt.

According to Figs. 2 to 5 the lens receiving collar 2 of the camera 1 has a bayonet slot 3 of noticeably different size, measured along the periphery of collar 2, than the bayonet slot 4, and a correspondingly large bayonet lug 3' is provided on the lens 6. Bayonet slot 3 and bayonet lug 3' may be easily felt without visual check as being different from the remaining bayonet slots 4 and bayonet lugs 4' respectively. This easy differentiation by feeling may be improved upon by fitting to the selected bayonet slot 3 and the selected bayonet lug 3' additional tactile elements, for instance the protuberance 5 in the case of the bayonet slot 3 and the notch 5' in the case of the bayonet lug 3'.

To facilitate the attachment, the selected camera bayonet slot 3 can be made with quick insertion means in the form of rounded off edges or guiding surfaces 9 (Fig. 4) which can also be used, if desired, in the case of the camera bayonet slots 4 and the protuberance 5.

According to Fig. 5 the selected bayonet lug 3' is made in the form of a cam 9 which, when inserted into the camera, actuates a control element 10 for operating a field of view framing arrangement, or for effecting a locking of the shutter winding and releasing mechanism, or a rangefinder arresting device and the like. By choosing the appropriate form of and position for the cam 9 it is possible to obtain for the control operation in the camera a varying range of the control element 10, as required, for instance, for lenses of different focal lengths.

According to Fig. 6 the lens mount part having the bayonet lugs 3', 4' is made as an intermediate screw collar 11 which, by means of the internal thread 12, is fitted to the lens 6 with corresponding external thread 13. In this case the intermediate screw collar 11 as well as the flange 7 as per Fig. 1 and Fig. 2 can be made with a recess 14 situated near the selected bayonet lug 3', so that the recess 14, when the bayonet connection between lens and camera is effected, allows of the rangefinder lever 15 in the camera to come into contact with the focusing mount of the lens. Recesses 14 may, however be provided between all the bayonet lugs 3', 4' in order to facilitate finding the selected bayonet lug 3' by simply feeling it.

We claim:
1. Bayonet joint for the separable union of an objective with a camera which comprises a camera housing having an opening in said housing with lugs extending into said opening and spaced to form notches between said lugs of different arcuate sizes, and an objective piece to extend into said opening and having outwardly projecting lugs and spaces between said lugs complementary to the lugs of said opening to permit the insertion of said objective piece and rotation on the axis of said opening to engage said lugs and fixed tactile elements on said housing and on said objective piece comprising a complementarily positioned projection and recess means, one on the housing and one on the objective piece, said notches and lugs being in complementary alignment when said tactile elements are in contiguous positions.

2. The bayonet joint of claim 1 in which said tactile elements are a notch on one element and a protuberance on the other.

3. The bayonet joint of claim 2 in which said notch and protuberance are complementary and interfit when aligned.

AUGUST BRÖHL.
LUDWIG LEITZ.

REFERENCES CITED

The following references are of record in the file of this patent:

UNITED STATES PATENTS

| Number | Name | Date |
|---|---|---|
| 2,052,261 | Verschoor | Aug. 25, 1936 |
| 2,110,477 | Wittel | Mar. 8, 1938 |
| 2,136,149 | Nuchterlein | Nov. 8, 1938 |
| 2,260,991 | Gorey | Oct. 28, 1941 |

FOREIGN PATENTS

| Number | Country | Date |
|---|---|---|
| 8,934 | Great Britain | of 1891 |
| 496,361 | Germany | Apr. 24, 1930 |
| 711,012 | Germany | Sept. 25, 1941 |